(12) United States Patent
Blomqvist et al.

(10) Patent No.: US 9,897,447 B2
(45) Date of Patent: Feb. 20, 2018

(54) QUADRATURE COMPENSATION

(71) Applicant: MURATA MANUFACTURING CO., LTD., Kyoto (JP)

(72) Inventors: Anssi Blomqvist, Helsinki (FI); Ville Pekka Rytkönen, Klaukkala (FI); Tommi Piirainen, Vantaa (FI)

(73) Assignee: MURATA MANUFACTURING CO., LTD., Kyoto (JP)

( * ) Notice: Subject to any disclaimer, the term of this patent is extended or adjusted under 35 U.S.C. 154(b) by 13 days.

(21) Appl. No.: 14/525,272

(22) Filed: Oct. 28, 2014

(65) Prior Publication Data

US 2016/0153781 A1    Jun. 2, 2016

(30) Foreign Application Priority Data

Nov. 1, 2013   (FI) ..................................... 20136071

(51) Int. Cl.
*G01C 19/56*    (2012.01)
*G01C 19/5719*  (2012.01)
*G01C 19/5726*  (2012.01)

(52) U.S. Cl.
CPC ......... *G01C 19/5719* (2013.01); *G01C 19/56* (2013.01); *G01C 19/5726* (2013.01)

(58) Field of Classification Search
CPC ................ G01C 19/56; G01C 19/5719; G01C 19/5726; G01C 19/5712; G01C 19/5762; G01C 19/5656; G01P 15/125
USPC ............... 73/514.12, 504.02, 504.14, 514.32
See application file for complete search history.

(56) References Cited

U.S. PATENT DOCUMENTS

| | | | | |
|---|---|---|---|---|
| 5,600,065 A * | 2/1997 | Kar | ..................... | G01C 19/5719 73/504.02 |
| 5,992,233 A * | 11/1999 | Clark | ................. | G01C 19/5719 361/280 |
| 6,250,156 B1 * | 6/2001 | Seshia | ................ | G01C 19/5719 73/504.12 |
| 7,051,590 B1 | 5/2006 | Lemkin et al. | | |
| 8,375,786 B2 * | 2/2013 | Neul | ......................... | 73/504.12 |

(Continued)

FOREIGN PATENT DOCUMENTS

| | | |
|---|---|---|
| EP | 2 071 284 A2 | 6/2009 |
| JP | 2000-028366 A | 1/2000 |
| JP | 2009-271052 A | 11/2009 |

OTHER PUBLICATIONS

Finnish Search Report dated Jun. 5, 2014 corresponding to Finnish Patent Application No. 20136071.

(Continued)

*Primary Examiner* — Helen Kwok
(74) *Attorney, Agent, or Firm* — Squire Patton Boggs (US) LLP

(57) ABSTRACT

A microelectromechanical sensor device that comprises a seismic mass, and a spring structure that defines for the seismic mass a drive direction, and a sense direction that is perpendicular to the drive direction. A capacitive transducer structure includes a stator to be anchored to a static support structure, and a rotor mechanically connected to the seismic mass. The capacitive transducer structure is arranged into a slanted orientation where a non-zero angle is formed between the drive direction and a tangent of the stator surface. The slated capacitive transducer structure creates an electrostatic force to decrease quadrature error of the linear oscillation.

13 Claims, 4 Drawing Sheets

(56) References Cited

U.S. PATENT DOCUMENTS

| | | |
|---|---|---|
| 2003/0200804 A1 | 10/2003 | Johnson |
| 2006/0213266 A1 | 9/2006 | French et al. |
| 2009/0320591 A1 | 12/2009 | Johnson |
| 2015/0082885 A1* | 3/2015 | Rinkio ............... G01C 19/5712 |
| | | 73/504.12 |

OTHER PUBLICATIONS

International Search Report application No. PCT/IB2014/065727 dated Feb. 4, 2015.
Finnish Patent and Registration Office, Office Action corresponding to Appln. No. 20136071, dated Sep. 18, 2017.
Japanese Patent Office, Office Action corresponding to Japanese Patent Appln. No. 527331/2016, dated Jun. 13, 2017.
Taiwanese Patent Office, Search Report corresponding to Patent Appln. No. 103137780, dated May 23, 2017.

* cited by examiner

QUADRATURE COMPENSATION

BACKGROUND

Field

The present invention relates to microelectromechanical devices and especially to a microelectromechanical sensor device, as defined in the preamble of the independent claim.

Description of Related Art

Micro-Electro-Mechanical Systems, or MEMS can be defined as miniaturized mechanical and electro-mechanical systems where at least some elements have a mechanical functionality. MEMS structures can be applied to quickly and accurately detect very small changes in physical properties. As an example, a microelectromechanical gyroscope can be applied to quickly and accurately detect very small angular displacements.

Motion can be considered to have six degrees of freedom: translations in three orthogonal directions and rotations around three orthogonal axes. The latter three may be measured by an angular rate sensor, also known as a gyroscope. MEMS gyroscopes use the Coriolis Effect to measure the angular rate. When a mass is moving in one direction and rotational angular velocity is applied, the mass experiences a force in orthogonal direction as a result of the Coriolis force. The resulting physical displacement caused by the Coriolis force may then be read from, for example, a capacitively, piezoelectrically or piezoresistively sensing structure.

In MEMS gyros the primary motion cannot be continuous rotation as in conventional ones due to lack of adequate bearings. Instead, mechanical oscillation may be used as the primary motion. When an oscillating gyroscope is subjected to an angular motion orthogonal to the direction of the primary motion, an undulating Coriolis force results. This creates a secondary oscillation orthogonal to the primary motion and to the axis of the angular motion, and at the frequency of the primary oscillation. The amplitude of this coupled oscillation can be used as the measure of the angular rate.

Gyroscopes are very complex inertial MEMS sensors. The basic challenge in gyroscope designs is that the Coriolis force is very small and therefore the generated signals tend to be minuscule compared to other electrical signals present in the gyroscope. Spurious resonances and susceptibility to vibration plague many MEMS gyro designs.

One challenge in gyroscope design is quadrature error motion. In an ideal gyroscope structure, the primary oscillation and the secondary oscillation are exactly orthogonal. However, in practical devices imperfections occur, causing direct coupling of the primary mode displacement of the seismic mass to the secondary mode of the gyroscope. This direct coupling is called the quadrature error. The phase difference between the angular motion signal and the quadrature signal is 90 degrees, which means that basically the quadrature error could be eliminated with phase sensitive demodulation. However, the quadrature signal can be very large in comparison with the angular motion signal, and may therefore cause unreasonable dynamic range requirements for the readout electronics or phase accuracy of the phase demodulation.

One known method to deal with this error source is electrostatic quadrature cancellation that removes the error signal at the sensor structure, before the quadrature signal is generated. For this, an electrostatic force, exactly in-phase with the primary oscillation and parallel to the secondary oscillation may be applied to the seismic mass.

Electrostatic quadrature suppression is a very effective and therefore widely used technique. It can also be easily combined for even higher performance with electronic quadrature cancellation and other processing methods in the integrated circuit side. However, advanced gyroscope structures may be complicated and the microfabrication tolerances may be poor compared to their dimensions, so voltages necessary to compensate the quadrature component in the drive motion may be very high. This tends to complicate electronics design and increases power consumption of the gyroscope device.

SUMMARY

The object of the present invention is to enhance quadrature compensation in microelectromechanical sensing. The objects of the present invention are achieved with a microelectromechanical sensor device according to the characterizing portion of the independent claim.

The claims define a microelectromechanical sensor device that comprises a seismic mass, a spring structure for suspending the seismic mass into a static support structure; excitation means for driving the seismic mass into linear oscillation, and a capacitive transducer structure. The spring structure defines for the seismic mass a drive direction, and a sense direction that is perpendicular to the drive direction. The linear oscillation has a direction which has a primary component in the drive direction and a secondary component by quadrature error in the sense direction. The capacitive transducer structure includes a stator to be anchored to a static support structure, a rotor mechanically connected to the seismic mass, and an electrical energy source arranged to create an electrostatic force between the stator surface and the rotor surface. The stator includes at least one stator surface, and the rotor includes a rotor surface positioned opposite the stator surface. The capacitive transducer structure is arranged into a slanted orientation where a non-zero angle is formed between the drive direction and a tangent of the stator surface, and the electrostatic force is directed to decrease the secondary component of the linear oscillation.

Due to the slanted orientation, also the distance between the stator and rotor surfaces changes during the linear oscillation of the seismic mass, introducing also gap modulation to the compensating force. This significantly increases effect of the compensating force.

Further advantages of the invention are discussed in more detail with the following embodiments.

BRIEF DESCRIPTION OF THE DRAWINGS

In the following, the invention will be described in greater detail, in connection with preferred embodiments, with reference to the attached drawings, in which.

DETAILED DESCRIPTION

The following embodiments are exemplary. Although the specification may refer to "an", "one", or "some" embodiment(s), this does not necessarily mean that each such reference is to the same embodiment(s), or that the feature only applies to a single embodiment. Single features of different embodiments may be combined to provide further embodiments.

In the following, features of the invention will be described with a simple example of a device architecture in which various embodiments of the invention may be implemented. Only elements relevant for illustrating the embodiments are described in detail. Various generic features of capacitive transducer structures or microelectromechanical devices that are generally known to a person skilled in the art may not be specifically described herein.

Figure 1:
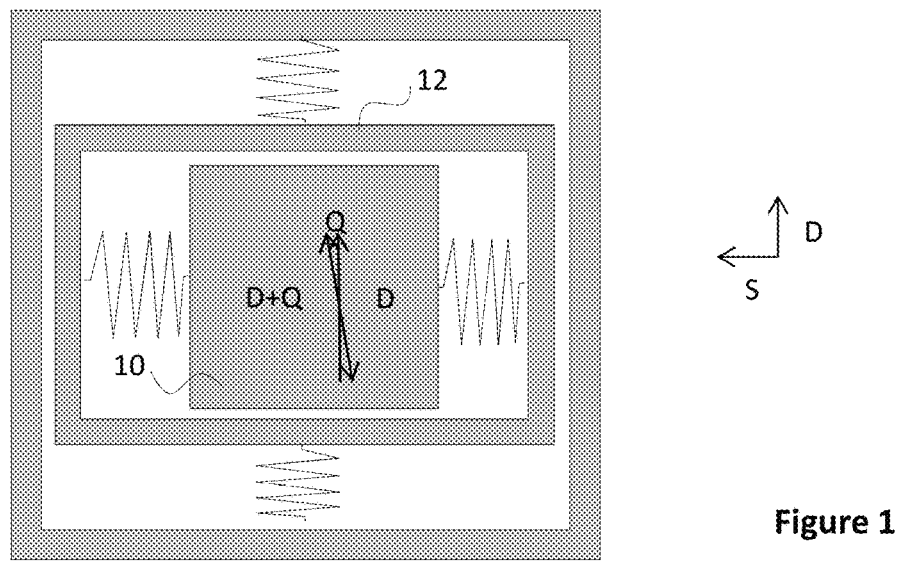
FIG. 1 illustrates a prior art capacitive transducer structure for electrostatic quadrature compensation.

FIG. 1 illustrates basic elements of an exemplary resonator structure in which a capacitive transducer structure may be applied for quadrature compensation. The device may include a seismic mass 10, a mass body that may be suspended to a static (non-oscillating) support structure to provide an inertial movement. In a gyroscope structure the static support may be provided by another body element of the gyroscope structure, for example, by an underlying handle wafer, or a covering cap wafer of a gyroscope die. It is noted, however, that divisions to a structure wafer, the handle wafer and the cap wafer are conceptual. For a person skilled in the art it is clear, for example, that the handle wafer and the structure wafer may be patterned separately or in combination from a layered silicon-insulator-silicon substrate.

The seismic mass 10 may be suspended to the static support through a spring structure 12. The string structure refers here to any elastically directional element that is configured by the dimensions and/or properties of the spring structure to be flexible to displacements of the seismic mass in at least one direction, and very rigid to displacements of the seismic mass in any other directions. In a gyroscope structure, the spring structure is typically designed to allow displacements of the seismic mass in a drive direction D and in a sense direction S. The drive direction D refers here to a designed direction of linear oscillation of the seismic mass 10, i.e. the direction of the linear oscillation of the seismic mass during ideal primary motion and in the absence of other forces acting on the seismic mass. The sense direction S refers here to a direction that is perpendicular to the drive direction, and therefore coincides with a detected Coriolis force resulting from angular motion of the resonator structure. FIG. 1 illustrates exemplary drive and sense directions in the exemplary simplified configuration. In practice, there are many ways to implement resonator structures, and arrange the sense and drive directions into them. Such solutions are widely documented and well known to a person skilled in the art of microelectromechanical devices.

The seismic mass 10 may be designed to be driven into linear oscillation in direction D, but because of the quadrature error, the direction of the actual motion of the seismic mass 10 is actually a result of a component in the drive direction D, and a secondary component Q generated by the quadrature error. This quadrature error may be eliminated by means of a capacitive transducer structure.

Figure 2:
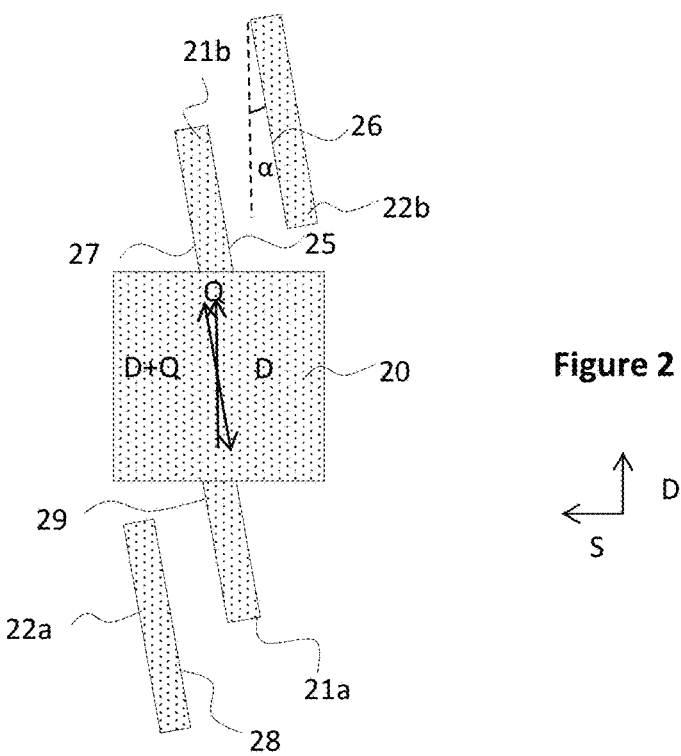
FIG. 2 illustrates an exemplary embodiment of a capacitive transducer structure.

FIG. 2 illustrates an exemplary embodiment of a capacitive transducer structure according to the present invention.

The disclosed configuration includes a seismic mass 20, suspended to a static support through a spring structure (not shown), as described above. The spring structure defines for the seismic mass a drive direction D, and a sense direction S that is perpendicular to the drive direction D, as shown in FIG. 2. The capacitive transducer structure includes also at least one rotor 21a or 21b. The term rotor refers here to an element that is mechanically connected to the seismic mass 20, and thereby interactively coupled to move along its motion in relation to the static support structure.

The term transducer refers in general to a device that converts one form of energy to another. Electromechanical transducers are devices that convert mechanical energy to electrical energy, for example mechanical motion into variations of electric current or voltage, and vice versa. The term capacitive transducer is used herein to refer to an entity that includes a capacitor with variable capacitance. A combination of mechanical and electrical elements required to induce or apply the variable capacitance forms a capacitive transducer structure. In an apparatus, the capacitance of the capacitive transducer structure may be configured to change due to a change in the value of a selected input quantity. In quadrature compensation, the input quantity corresponds to spatial orientation of elements of the capacitive transducer structure, which spatial orientation changes in response to linear oscillation of a seismic mass of a gyroscope structure.

The capacitive transducer structure 20 may also include at least one stator 22a, 22b. The term stator refers here to an element that is fixedly anchored to a static support structure. Depending on the configuration, the stator and the rotor may be anchored and suspended to a same static support structure or to different static support structures. As shown in FIG. 2, the rotor may include a comb finger, an elongate element projecting out of the seismic mass 20. The stator may also include an elongate element positioned such that an elongate stator surface 26 extends opposite an elongate rotor surface 25.

The rotor 21b may include at least one planar rotor surface 25, and the stator 22b may include at least one planar stator surface 26. This means that at least part of the volume of the stator or rotor extends along a plane in two dimensions (length, width) and forms therein a planar surface. Within tolerances, the planar surface can thus be considered to contain all straight lines that connect any two points on it. It is, however, understood that a planar surface may include minor protrusions patterned on the rotor, or recesses patterned into it. It is noted that other forms of surfaces may applied within the scope, as well. For example, the surfaces may be curved or arched.

The rotors 21a, 21b and the stators 22a, 22b are configured to form pairs such that in a pair of a stator 21b and a rotor 22b, the stator surface 26 of the stator 22b and the rotor surface 25 of the rotor 21b are positioned opposite to each other. This means that the stator surface and the rotor surface are set over against the other across an intervening space. Advantageously, but not necessarily, the stator surface and the rotor surface are in initial state mutually aligned. The initial state refers here to the static state where the rotor is suspended to the static support structure but is not driven to move, or exposed to other external forces. In the example of FIG. 2, the stator surfaces and rotor surfaces are planar, and the planar stator surfaces and the rotor surfaces in initial state are parallel to each other. In case of curved surfaces, initially the at least one curve of the stator surface is advantageously aligned with the at least one curve of the rotor. In the example of FIG. 2, the rotor includes two comb fingers 21a, 21b, projecting in opposite sides from the seismic mass. The stator includes also two stator comb fingers 22a, 22b and each of the rotor comb fingers 21a, 21b is arranged to oscillate opposite to a respective stator finger 22a, 22b. Either or both of the rotor comb fingers 21b includes an elongate rotor surface 25 on at least one side of the rotor comb finger such that the stator and rotor pairs in FIG. 2 are as follows: 21a and 22a, 21b and 22b.

The rotors 21a, 21b of FIG. 2 are mechanically connected to the seismic mass 20 such that each of the stator and rotor surface pairs forms a capacitor. The capacitive transducer structure includes also an electrical energy source (not shown) that is arranged to create an electrostatic force between the pairs of a stator surface and a rotor surface opposite it. Through the structural arrangement of the elements, the capacitance of the capacitor of the stator and rotor surface pair may be arranged to change when the rotor moves in relation to the stator because of the induced drive motion. This change of capacitance may also be arranged to modulate an electrostatic force between the stator surface and the rotor surface such that the electrostatic force opposes the quadrature error motion, and thereby reduces its effect as early as possible.

The seismic mass 20, and thereby the rotors 21a, 21b may be excited to primary motion in a predetermined direction D. It is understood that various excitation structures capable of creating a driving input force in a specific direction may be applied within the scope. The excitation means may include separate a electrode that is configured to move with the seismic mass 20, and interact electrically with further static electrode or electrodes (not shown), and as a result of this electrical interaction induce the seismic mass 20 to move. Alternatively, the seismic mass may itself be formed of conductive material, or include a deposited layer of conductive material that interacts with a further static electrode or electrodes. Also piezoelectrical excitation may be applied. Seismic mass excitation mechanisms are well known to a person skilled in the art, and will not be discussed in detail herein. The direction of the excited motion is mainly defined by the spring structure that supports the seismic mass 20.

In linear oscillation, the seismic mass moves back and forth on an axis of oscillation about a point of equilibrium. The excitation means and the suspending springs are designed to drive the seismic mass 20 into linear oscillation in direction D, but, as discussed above, because of the quadrature error, the direction of the actual motion of the seismic mass 20 is actually a result of a primary component in the drive direction D, and a secondary component Q generated by the quadrature error. Since the quadrature error is caused by unintentional defects, its total magnitude and direction may vary from structure to structure. From the quadrature error elimination point of view, a varying component Q generated by the quadrature error in a direction perpendicular to the drive direction is most relevant. In FIG. 2, the direction of the linear oscillation by the primary motion and the quadrature error is illustrated with the arrow D+Q. The quadrature error motion results into a deviation of the actual axis of oscillation from the intended axis of oscillation. In the configuration of FIG. 2, the intended axis of oscillation is parallel to the drive direction D, but due to the quadrature error motion Q, the actual axis of oscillation would be parallel to the direction D+Q.

Let us assume that during the linear D+Q oscillation, the seismic mass 20, and thereby also the rotor 21a displaces an amount X in the drive direction D and a small amount Y in the perpendicular sense direction S. This changes capacitances of the capacitors and creates a force for compensation against the quadrature error motion of the seismic mass. The total force acting on the seismic mass 20 in y-direction may be determined from the sum of forces:

$$F_i = \frac{1}{2} \frac{\partial C_i}{\partial Y} V_i^2$$

Where $C_i$ is a capacitor formed by a stator and rotor pair, and $V_i$ is the voltage between them. This total force is negative in sign and includes the drive displacement X. Accordingly; the capacitive transducer structure creates a force against the displacement Y in the sense direction S in phase with the displacement X in the drive direction D.

In embodiments of the invention, the capacitive transducer structure is arranged into a slanted orientation where a non-zero angle α is formed between the drive direction and a tangent of the stator surface. In the example of FIG. 2, the stator surfaces are planar and the tangent of a stator surface is thus aligned with it. It is noted that in order to visually highlight the orientation, the non-zero angle α is exaggerated in FIG. 2. Typically a smaller angle is applied, as will be discussed later on. As shown in FIG. 2, an angle α is formed between the drive direction D and the stator surface 26 of the stator 22b.

As discussed earlier, conventionally the varying overlap between opposing stator and rotor surfaces has been applied to create a force to compensate the quadrature error motion of the seismic mass. However, due to the slanted orientation, also the distance between the stator and rotor surfaces changes during the linear oscillation of the seismic mass, which introduces gap modulation to the compensating force. With typical dimensions of microelectromechanical gyroscope structures, the effect of this gap modulation has turned out to be very strong. For example, with the configuration of FIG. 2, a slanted orientation with α=1° and gap width of 2.5 µm, a +50% increase in the compensating force was measured. The slanted orientation with α=2° and gap width of 2.5 µm provided a +100% increase to the compensating force.

Preferably the angle α of the slanted orientation is arranged to be larger than the angle of the expected quadrature deflection. The quadrature deflection angle in microelectromechanical gyroscope structures is typically less than 1°, and optimal angles of the slanted orientation have proved to be in the range of α=0.5-2°.

FIG. 2 illustrates a configuration where compensating forces are created with two capacitors arranged in opposite pairs into lateral positions of the seismic mass. Lateral positions refer here to locations in the opposite extremes of the seismic mass along the primary motion of the seismic mass. Opposite pairs means here that the electrostatic force created between the stator surface 26 and the rotor surface 25 of the first pair of capacitor electrodes 21b and 22b is opposite to the electrostatic force created between the stator surface 28 and the rotor surface 29 of the second pair of capacitor electrodes 21a and 22a. In the configuration of FIG. 2 this is achieved by arranging the rotor surfaces 25, 29 and the stator surfaces 26, 28 in to be parallel; the stators 22a, 22b being positioned to opposite sides from the intended axis of oscillation. Accordingly, when the seismic mass 20 moves upwards in the shown orientation, the quadrature error motion would shift the seismic mass to the left, but the electrostatic force of the first pair of capacitor electrodes 21b and 22b reduces this deviation. Similarly, when the seismic mass 20 moves downwards in the shown orientation, the quadrature error motion would shift the seismic mass to the right, but the electrostatic force of the second pair of capacitor electrodes 21a and 22a reduces this deviation. The result of the quadrature error motion and the compensation by the capacitor pair shifts the actual axis of oscillation closer to the intended axis of oscillation.

The orientation of the opposite capacitor pairs is important; if the created electrostatic forces would not be opposite, but be in the same a force modulated at twice the primary oscillation frequency would be created. Such force would naturally not be applicable to compensate for quadrature error motion of linear oscillation.

In order to multiply the quadrature compensating force, the seismic mass may include a quadrature compensation comb that includes a plurality of capacitors, formed by opposing stator and rotor pairs. It is understood that while the electrostatic force is inversely proportional to the square of the distance between the charges, in practice a repulsive force cannot be effectively applied for quadrature compensation.

Figure 3:
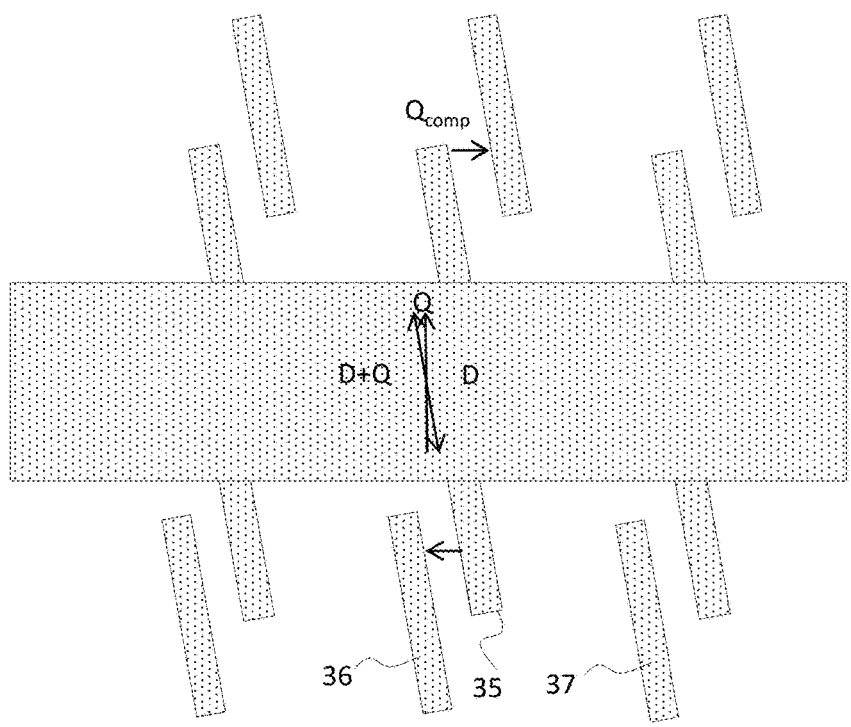
FIG. 3 illustrates a simplified structure of quadrature compensation comb.

FIG. 3 illustrates a simplified structure of quadrature compensation comb that includes a number of compensating structures of FIG. 2 to compensate quadrature error in one direction $Q_{comp}$. It is noted that a rotor comb finger 35 is in practice exposed to opposite electrostatic forces by stator comb fingers 36 and 37. However, because of the inverse proportionality to the square of the distance, the effect of the closer (opposite) stator comb finger 36 dominates. This compensation comb configuration is simple to bias but still allows tight comb structures and therefore efficient use of surface area for quadrature compensation. Advantageously, a gyroscope structure may include one comb for quadrature compensation in the positive sense direction and one comb structure for compensation in the negative sense direction. It is noted that the scope includes also configurations with only one capacitor per seismic mass. However, such structure may in practice be unbalanced and therefore not operate optimally.

Figure 4:
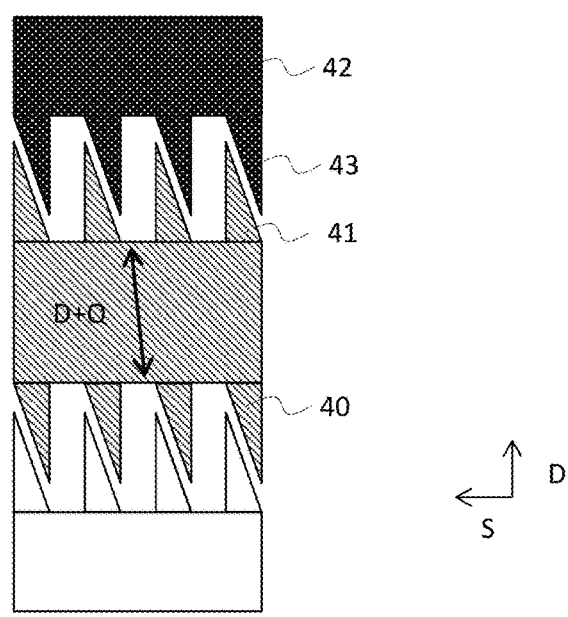
FIG. 4 illustrates a further embodiment of a quadrature compensation comb.

FIG. 4 illustrates another type of a quadrature compensation comb structure. The structure includes a seismic mass 40 with a plurality of rotor comb fingers 41 projecting from the seismic mass 40. The structure may include also a stator comb 42 with a plurality of stator comb fingers 43. The stator surfaces of the stator comb fingers are arranged into opposite position in respect of the rotor surfaces of the rotor comb fingers 43. The seismic mass may be configured to be excited to a linear oscillation in the drive direction D. The fingers of the quadrature compensation comb may be in a slanted orientation such that a non-zero angle α is again formed between the drive direction D and the stator surfaces of the stator comb fingers 43. A stator surface providing the side of the angle α may, but does not necessarily be planar and extend to the whole length of its stator comb finger. The rotor surfaces of rotor comb fingers 41 may be correspondingly planar and be aligned with the stator surface. The other sides of the stator comb fingers and rotor comb fingers may be aligned with the drive direction D, thus forming a non-symmetric sawtooth-shaped compensation structure. The slanted orientation of the stator and rotor finger pairs provides the improved efficiency in quadrature compensation, as discussed above. The non-symmetric sawtooth-shaped compensation comb structure allows a tightened packing of the enhanced compensating finger pairs. A high performance is thus achieved with a reduced component size.

Figure 5:
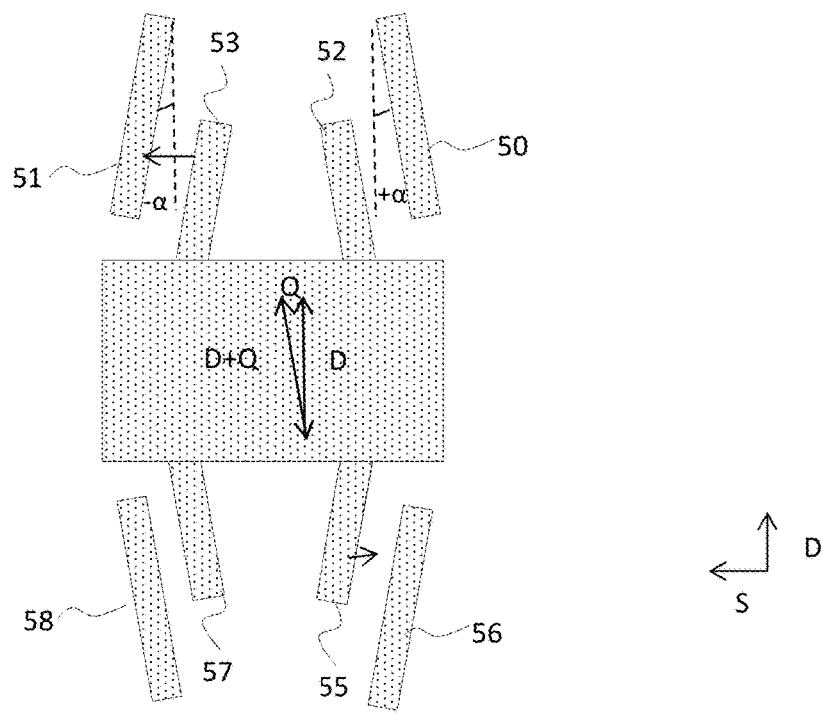
FIG. 5 illustrates a further capacitive transducer structure.

FIG. 5 illustrates a further structure where compensating forces may be created in both directions, and the slanted orientation of the stator and rotor finger pairs provides the improved efficiency to quadrature compensation in both directions. The capacitive transducer configuration may include at least two stators 50, 51, where a positive non-zero angle +α is formed between the drive direction D and a tangent of a stator surface of the first stator 50, and a negative non-zero angle −α is formed between the drive direction D and a tangent of a stator surface of the second stator 51. The first stator 50 may be positioned opposite a first rotor 52, and the stator surface of the first stator 50 may be initially aligned to be parallel with the rotor surface of the first rotor 52. Correspondingly, second stator 51 may be positioned opposite a second rotor 53, and the stator surface of the second stator 51 may be initially aligned to be parallel with the rotor surface of the second rotor 53. A compensating force may be thus effectively created in both sense directions.

As shown in FIG. 5, also this configuration may be implemented with capacitors arranged in pairs into opposite lateral positions of the primary motion. A capacitor of the first stator 50 and the first rotor 52, and a capacitor of a third stator 58 and a third rotor 57 may be applied to compensate a quadrature component in a negative sense direction and a capacitor of the second stator 51 and the second rotor 53, and a capacitor of a fourth stator 56 and a fourth rotor 55 may be applied to compensate a quadrature component in a positive sense direction. Also this structure may be applied to form a quadrature compensation comb, where capacitors creating the electrostatic forces in opposite directions are arranged sequentially into parallel orientation along the sense direction S.

Figure 6:
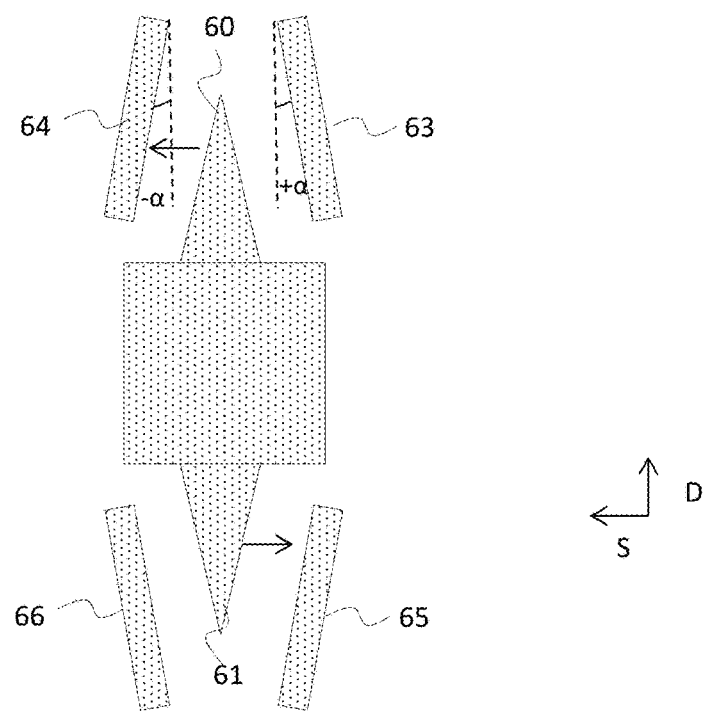
FIG. 6 illustrates a further embodiment that applies the element of the capacitive transducer structure of FIG. 5.

FIG. 6 illustrates a further embodiment that applies the element of the capacitive transducer structure of FIG. 5, but the separate rotor comb fingers 52, 53 and 55, 57 have now been merged into tapering rotor comb fingers 60, 61. A tapering rotor comb finger 60 may include two rotor surfaces, one arranged opposite to a stator surface of a first stator 63, and one opposite to a stator surface of a second stator 64. A similar arrangement of opposite stator and rotor surfaces may be arranged into opposite lateral position of the seismic mass, in respect of the primary motion of the seismic mass. Also this structure may be applied to form a quadrature compensation comb, where capacitors creating the electrostatic forces in opposite directions are arranged sequentially into parallel orientation along the sense direction S. The configuration of FIG. 6 produces the same improved effect as the configuration of FIG. 5, but requires less surface area.

Figure 7:
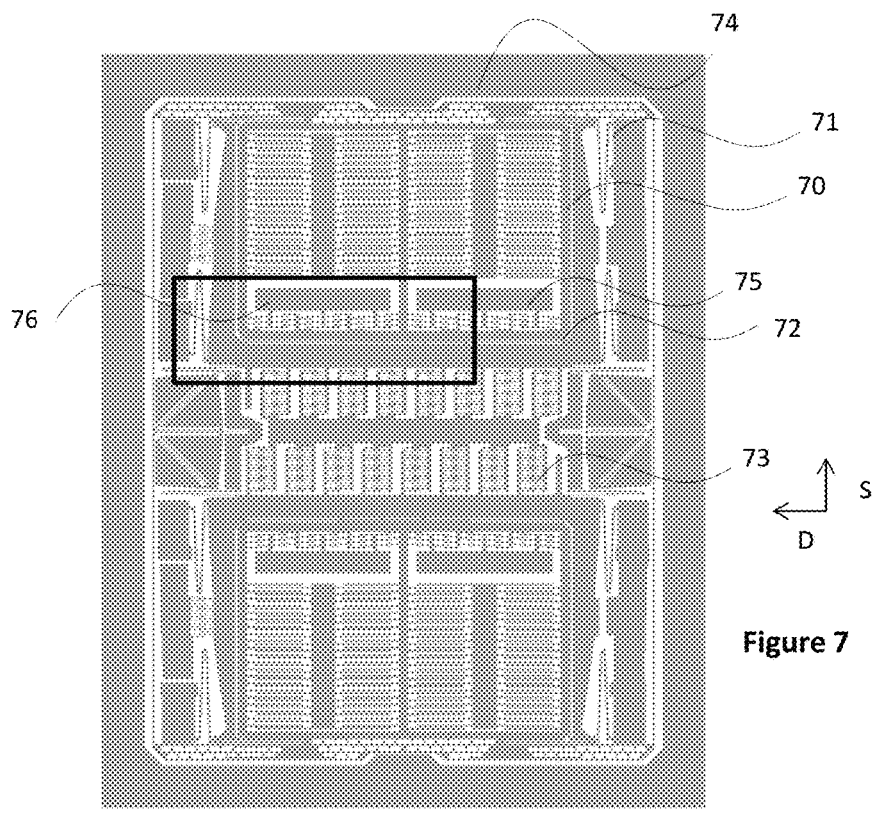
FIG. 7 illustrates a microelectromechanical sensor device that includes at least one capacitive transducer structure of FIGS. 2 to 6.

Embodiments of the invention include a microelectromechanical sensor device that includes at least one capacitive transducer structure of FIGS. 2 to 6. FIG. 7 illustrates such embodiments with an exemplary gyroscope structure that includes at least one seismic mass 70. The seismic mass 70 may be suspended with a spring structure 71, 72 to a static support structure. The seismic mass 70 may be suspended to have two degrees of freedom, one in the drive direction D of the primary motion and one in the sense direction S that is opposite to the drive direction, as shown in FIG. 7. The gyroscope structure may include an excitation comb 73 for driving the seismic mass 70 into the primary motion and a sense comb structure 74 for sensing the movement of the seismic mass because of a Coriolis force resulting from angular motion of the gyroscope structure. A capacitive transducer structure 75 may be applied to compensate a quadrature error in the positive sense direction, and a capacitive transducer structure 76 may be applied to compensate a quadrature error in the negative sense direction. As shown in FIG. 7, the microelectromechanical sensor device may include two such gyroscope structures in axial symmetry on a plane.

Figure 8:
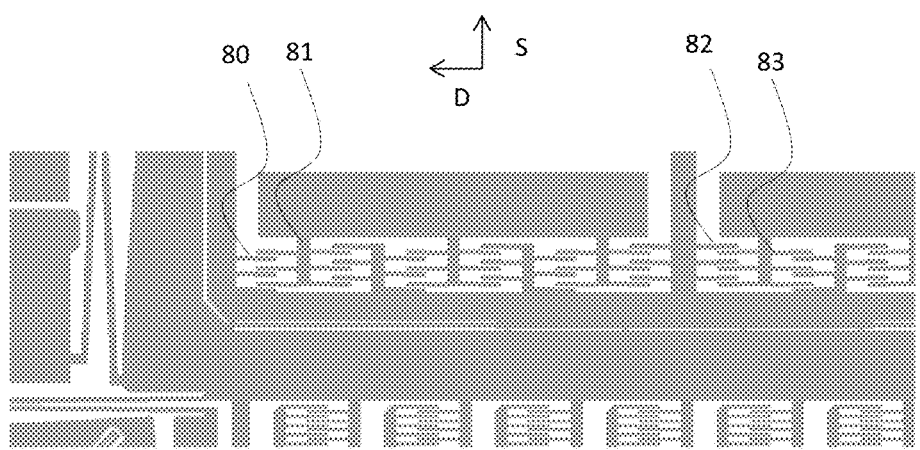
FIG. 8 illustrates a detail of the microelectromechanical sensor device of FIG. 7.

FIG. 8 shows an enlarged extract of the gyroscope structure of FIG. 7. FIG. 8 shows in more detail a rotor comb structure 80 and a stator comb structure 81 of the capacitive transducer structure 76 of FIG. 7. The non-zero angle between the drive direction D and the stator surface of a finger in the stator comb 81 is small, but the slanted orientation may be seen in FIG. 8. The electrostatic force of the capacitive transducer structure 76 is directed to decrease quadrature error in the positive S-direction, i.e. the electrostatic force of the capacitive transducer structure pulls the fingers of the rotor comb to the negative S-direction when mass deflects in the positive D-direction. Correspondingly, FIG. 8 shows in more detail a rotor comb structure 82 and a stator comb structure 83 of the capacitive transducer structure 75 of FIG. 7. The electrostatic force of the capacitive transducer structure 75 is directed to decrease quadrature error in the negative S-direction, i.e. the electrostatic force of the capacitive transducer structure pulls the fingers of the rotor comb to the positive S-direction. Because of the slanted orientation of the fingers, a very effective compensation is achieved.

It is apparent to a person skilled in the art that as technology advances, the basic idea of the invention can be implemented in various ways. The invention and its embodiments are therefore not restricted to the above examples, but they may vary within the scope of the claims.

The invention claimed is:

1. A microelectromechanical sensor device, comprising:
a seismic mass;
a spring structure for suspending the seismic mass into a static support structure, wherein the spring structure defines for the seismic mass a drive direction, and a sense direction that is perpendicular to the drive direction;
an excitation element for driving the seismic mass into a linear drive oscillation, the drive oscillation having a direction which has a primary component in the drive direction and a secondary component by quadrature error in the sense direction;
a sense element for sensing a movement of the seismic mass because of a Coriolis force resulting from angular motion of the microelectromechanical sensor device;
a capacitive transducer structure that includes:
 a stator to be anchored to the static support structure, wherein the stator includes a slanted first stator element and a slanted second stator element,
 a rotor mechanically connected to the seismic mass, wherein the rotor includes a first rotor element positioned opposite the first stator element, and a second rotor element positioned opposite the second stator element, wherein the first rotor element and the first stator element form a first capacitive transducer in which capacitance increases in phase with displacements of a drive direction oscillation, and the second rotor element and the second stator element form a second capacitive transducer in which capacitance increases in opposite phase with displacements of the drive direction oscillation; and
 an electrical energy source connected to create a voltage between the stator and the rotor,
 wherein a first electrostatic force directed against the secondary component of the linear drive oscillation is created between the first stator element and the first rotor element of the first capacitive transducer, a second electrostatic force directed against the secondary component of the linear drive oscillation is created between the second stator element and the second rotor element of the second capacitive transducer, and the first electrostatic force is opposite to the second electrostatic force, and
 wherein the first capacitive transducer and the second capacitive transducer are configured into a slanted orientation in which a non-zero angle is formed between the drive direction and a tangent of the slanted first stator element, wherein the non-zero angle is formed between the drive direction and a tangent of the slanted second stator element, and the slanted first stator element and the slanted second stator element are parallel, whereby the first electrostatic force against the secondary component of the linear drive oscillation becomes gap modulated in phase with displacements of the drive direction oscillation, and the second electrostatic force against the secondary component of the linear drive oscillation becomes gap modulated in opposite phase with displacements of the drive direction oscillation.

2. A microelectromechanical sensor device of claim 1, wherein the first stator element and the first rotor element of the first capacitive transducer are planar or curved, or the second stator element and the second rotor element of the second capacitive transducer are planar or curved.

3. A microelectromechanical sensor device of claim 1, wherein the first rotor element and the second rotor element are parallel to the first stator element and the second stator element.

4. A microelectromechanical sensor device of claim 1, wherein at least one of the first capacitive transducer or the second capacitive transducer further comprises at least one rotor comb finger that includes an elongate rotor surface.

5. A microelectromechanical sensor device of claim 4, wherein at least one of the first capacitive transducer or the second capacitive transducer further comprises a stator comb finger that includes an elongate stator surface, positioned such that the elongate stator surface extends opposite the elongate rotor surface.

6. A microelectromechanical sensor device of claim 4, wherein each of the first capacitive transducer and the second capacitive transducer includes at least one rotor comb finger, and a pair of a rotor comb finger of the first capacitive transducer and a rotor comb finger of the second capacitive transducer that project to opposite directions from the seismic mass.

7. A microelectromechanical sensor device of claim 1, wherein the first capacitive transducer includes one stator comb finger providing the first stator element for the first rotor element of one of a plurality of rotor comb fingers, and the second capacitive transducer includes another stator comb finger providing the second stator element for the second rotor element of one of the rotor comb fingers in the opposite lateral position of the drive oscillation of the seismic mass.

8. A microelectromechanical sensor device of claim 7, wherein
the first rotor element and the second rotor element of a pair of rotor comb fingers are in parallel.

9. A microelectromechanical sensor device of claim 5, wherein
the capacitive transducer structure includes a third capacitive transducer;
the first capacitive transducer includes a first pair of stator and rotor comb fingers;

the third capacitive transducer includes a third pair of stator and rotor comb fingers;

the stator surface of the stator comb finger of the first capacitive transducer, and the rotor surface of the rotor comb finger of the first capacitive transducer are parallel and slanted by a positive non-zero angle in respect of the drive direction;

the stator surface of the stator comb finger of the third capacitive transducer, and the rotor surface of the rotor comb finger of the third capacitive transducer are parallel and slanted by a negative non-zero angle in respect of the drive direction.

10. A microelectromechanical sensor device of claim 9, wherein the capacitive transducer structure comprises four pairs of stator and rotor comb fingers;

the second capacitive transducer includes a second pair of stator and rotor comb fingers;

a fourth capacitive transducer includes a fourth pair of stator and rotor comb fingers;

the similarly slanted first capacitive transducer and the fourth capacitive transducer are in one lateral position of the drive oscillation of the seismic mass, and the similarly slanted second capacitive transducer and the third capacitive transducer are in another lateral position of the drive oscillation of the seismic mass.

11. A microelectromechanical sensor device of claim 9, wherein at least one of the rotor comb finger of the first capacitive transducer or the third capacitive transducer is formed of one tapered rotor comb finger element that includes a rotor surface slanted by the positive non-zero angle in respect of the drive direction, and a rotor surface slanted by the negative non-zero angle in respect of the drive direction.

12. A microelectromechanical sensor device of claim 5, wherein in the first capacitive transducer or in the second capacitive transducer, the stator and rotor comb fingers are configured in pairs into the slanted orientation such that:

in a stator comb finger of the stator and rotor comb finger pair, the stator surface that forms a side of the non-zero angle to the drive direction is planar and extends to the whole length of the stator comb finger;

in a rotor comb finger of the stator and rotor comb finger pair, the rotor surface is planar and is aligned parallel to the stator surface;

the opposite sides of the stator comb finger and the rotor comb finger are aligned with the drive direction, forming a non-symmetric sawtooth-shaped compensation structure.

13. A microelectromechanical sensor device of claim 1, wherein the non-zero angle is in the range of 0.5-2°.

* * * * *